US009530276B2

(12) United States Patent
Petersen et al.

(10) Patent No.: US 9,530,276 B2
(45) **Date of Patent: *Dec. 27, 2016**

(54) SINGLE SIGN-ON FOR WAGER GAMING PLAYERS OVER A WIDE-AREA NETWORK

(71) Applicant: IGT, Las Vegas, NV (US)

(72) Inventors: Erik B. Petersen, Reno, NV (US); Kevin M. Higgins, Reno, NV (US); Steven G. LeMay, Reno, NV (US); William C. Little, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,088

(22) Filed: Jan. 20, 2016

(65) Prior Publication Data

US 2016/0140803 A1 May 19, 2016

Related U.S. Application Data

(63) Continuation of application No. 14/676,358, filed on Apr. 1, 2015, now Pat. No. 9,245,415, which is a continuation of application No. 13/546,845, filed on Jul. 11, 2012, now Pat. No. 9,039,518.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ....... *G07F 17/3241* (2013.01); *G07F 17/3225* (2013.01); *G07F 17/3237* (2013.01); *G07F 17/3239* (2013.01); *G07F 17/3244* (2013.01)

(58) Field of Classification Search

CPC ............................ G07F 17/32; G07F 17/3248
USPC ............................ 463/20, 25, 39, 40, 41, 42
See application file for complete search history.

(56) References Cited

U.S. PATENT DOCUMENTS

| | | | | |
|---|---|---|---|---|
| 2002/0073021 | A1 | 6/2002 | Ginsberg et al. | |
| 2005/0261058 | A1* | 11/2005 | Nguyen | G07F 17/32 463/40 |
| 2006/0264257 | A1* | 11/2006 | Jaffe | G07F 17/32 463/20 |
| 2008/0113776 | A1 | 5/2008 | Sommer | |

(Continued)

*Primary Examiner* — Adetokunbo O Torimiro
(74) *Attorney, Agent, or Firm* — Neal, Gerber & Eisenberg LLP

(57) ABSTRACT

When the player identifies herself to a gaming machine at a casino, for example by inserting a player tracking card into the card reader, she is, at generally the same time, logging onto a game provider's backend system (the game provider being different from the casino operator). This concurrent sign-on to the game provider's system is done in a non-intrusive, transparent, and passive manner. The player is not distracted from the normal steps leading to game play on the machine until she is ready to redeem points with the game provider or for some reason additional authentication is needed from the player. By virtue of this single sign-on to the game provider network, in addition to continuing game play across different casinos, the player can publish events to the Internet, such as on social networking sites, take advantage of offers targeted specifically for her, or facilitate responsible gaming programs.

17 Claims, 6 Drawing Sheets

(56) References Cited

U.S. PATENT DOCUMENTS

| | | | | |
|---|---|---|---|---|
| 2009/0143128 | A1* | 6/2009 | Cautley | G07F 17/32 463/17 |
| 2009/0320116 | A1* | 12/2009 | Guo | G06F 21/41 726/9 |
| 2010/0064349 | A1* | 3/2010 | Randle | H04L 63/10 726/4 |

* cited by examiner

SINGLE SIGN-ON FOR WAGER GAMING PLAYERS OVER A WIDE-AREA NETWORK

PRIORITY CLAIM

This application is a continuation of, claims priority to and the benefit of U.S. patent application Ser. No. 14/676,358, filed on Apr. 1, 2015, which is a continuation of, claims priority to and the benefit of U.S. patent application Ser. No. 13/546,845, filed on Jul. 11, 2012, now U.S. Pat. No. 9,039,518, the entire contents of which are each incorporated by reference herein.

BACKGROUND

1. Field of the Invention

The present invention relates generally to wager gaming systems and wide area networks. More particularly, it relates to enabling a player to log on to a wide area gaming network from a gaming machine or other computing device to access player data and various services.

2. Description of the Related Art

Patrons of gaming establishments often play games at different venues and casinos. A player may play a certain game on a gaming machine at one casino and then want to continue playing the same game at a different casino. Many players would like to keep track of their progress in the same game across multiple casinos or properties. For example, if a player plays Wheel of Fortune at a casino A and achieves a certain score, she would like to continue playing the same game and begin with the same score when she resumes play at casino B or at a different gaming machine at casino A. She may also like to have any winnings or other events published online, such as to social networking sites, to inform certain friends.

Players would like to essentially log onto a system that keeps track of a player's profile and game status data whenever the player identifies herself to a gaming machine, for example, through a casino's loyalty program, also known as a player tracking system. This single sign-on process should be as passive as possible when treating or interacting with the player. That is, it should not require the player to enter additional or duplicative information about herself when starting game play on a machine. Ideally, the player should not be distracted from what is generally the normal or conventional course of game play. That is, it would be preferable if the single sign-on to the gaming network was efficient and transparent to the player. Additionally, it should be done without the need for full user authentication with regard to normal game play and accumulating points. The player's account data, including profile data and point accumulation, should be done seamlessly and require little or no extra effort from the player, with the exception of when the player is redeeming points. At that time, it is acceptable that there be more interaction with the player in order to verify the redemption.

SUMMARY OF THE DESCRIBED EMBODIMENTS

In one aspect of the present invention, a method of logging a player into a gaming network from a gaming machine is described. At a game provider server, an enterprise player identifier is received. This identifier may be a player tracking number for the player at a particular casino. The enterprise player identifier is resolved to a federated player identifier. The game provider identifier is transmitted to a game executing on a gaming machine. The game provider identifier is then used to retrieve player profile data or game-specific status data to be utilized on the gaming machine. In this manner, a player can access a profile from any participating enterprise.

Another aspect of the present invention is a method of executing a wager game on a gaming machine. An enterprise player ID is received at a gaming machine. The enterprise player ID is transmitted to an external game provider ID system where the enterprise player ID is resolved to a federated player ID. The gaming machine receives the federated player ID. An external database is queried using the federated player ID to obtain player and game status information on the gaming machine. Game play data is then recorded to the database using the federated player ID.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

Figure 1:
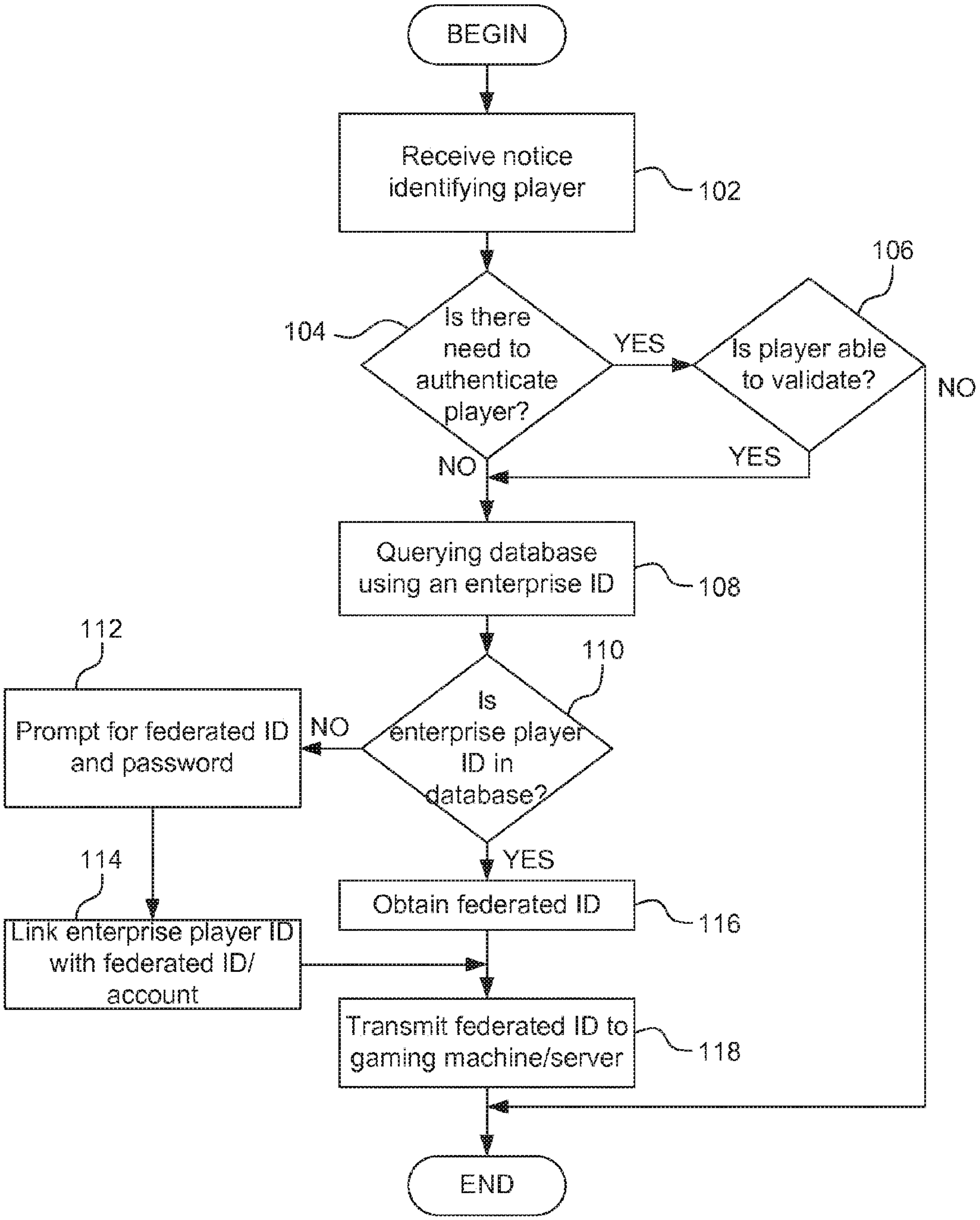
FIG. 1 is a flow diagram of a process for resolving an enterprise player ID to a game provider federated ID in accordance with one embodiment of the present invention.

Most casinos have electronic gaming machines that are supplied by a gaming machine provider or manufacturer. The wager games that execute on those machines are also often supplied by the same provider or manufacturer. Casino patrons often visit different casinos and are likely to play the same games at those casinos and occasionally try playing different games. In many cases, as noted, the games and gaming machines are from the same provider/manufacturer. When a player visits different casinos, she may identify herself to a gaming machine at the casinos by swiping or inserting a loyalty program card, also known as a player tracking card, so that she can accumulate points with a particular casino. If the game she is playing is the same as the game she played at another casino, with the present invention, she can access, via the gaming machine, her player profile and previous game status (from the first casino), such as her score, and essentially continue playing and progressing with that same game.

According to various embodiments of the present invention, by logging into the player tracking system or by identifying herself in another manner to the gaming machine, she is concurrently signing onto a wide area network of gaming services managed and operated by a gaming machine provider. This provider is typically a different entity from the casino. For example, the casino may be the MGM Grand which operates gaming machines and games manufactured by IGT of Reno, Nev. IGT, separate from MGM Grand, can record and maintain data on players, such as player profiles, game status, and the like. In one embodiment, the gaming machine provider maintains a central repository for player data and is able to recognize a single player across multiple platforms and properties/casinos. This allows a player to participate in promotions and marketing provided by the game provider (e.g., IGT) across different casinos. Other scenarios are also possible. The user interface and experience on the gaming machines for the player to interact with the gaming machine provider is generally the same at the different casinos and the logic for the user interface may be stored in one location by the gaming machine provider.

According to the present invention, when the player identifies herself to a gaming machine, for example at MGM Grand, by inserting an MGM Grand player tracking card into the card reader, she is, at generally the same time, logging onto the game provider's backend system. As described below, this concurrent sign-on to the game provider's system (e.g., IGT's system) is done in a non-intrusive, transparent, and passive manner. The player is not distracted from the normal steps leading to game play on the machine until she is ready to redeem points with IGT or for some reason additional authentication is needed from the player. By virtue of this single sign-on to the game provider network, in addition to continuing game play across different casinos, the player can publish events to the Internet, such as on social networking sites, take advantage of offers targeted specifically for her, facilitate responsible gaming programs, and the like. Many of these advantages cannot be achieved through conventional player tracking systems because they require operation and management of a wide area network (WAN) of gaming machines and servers spanning multiple casinos and properties. Many casino operators maintain WANs. The present invention describes ways of bridging the WANs of different enterprises.

Figure 3:
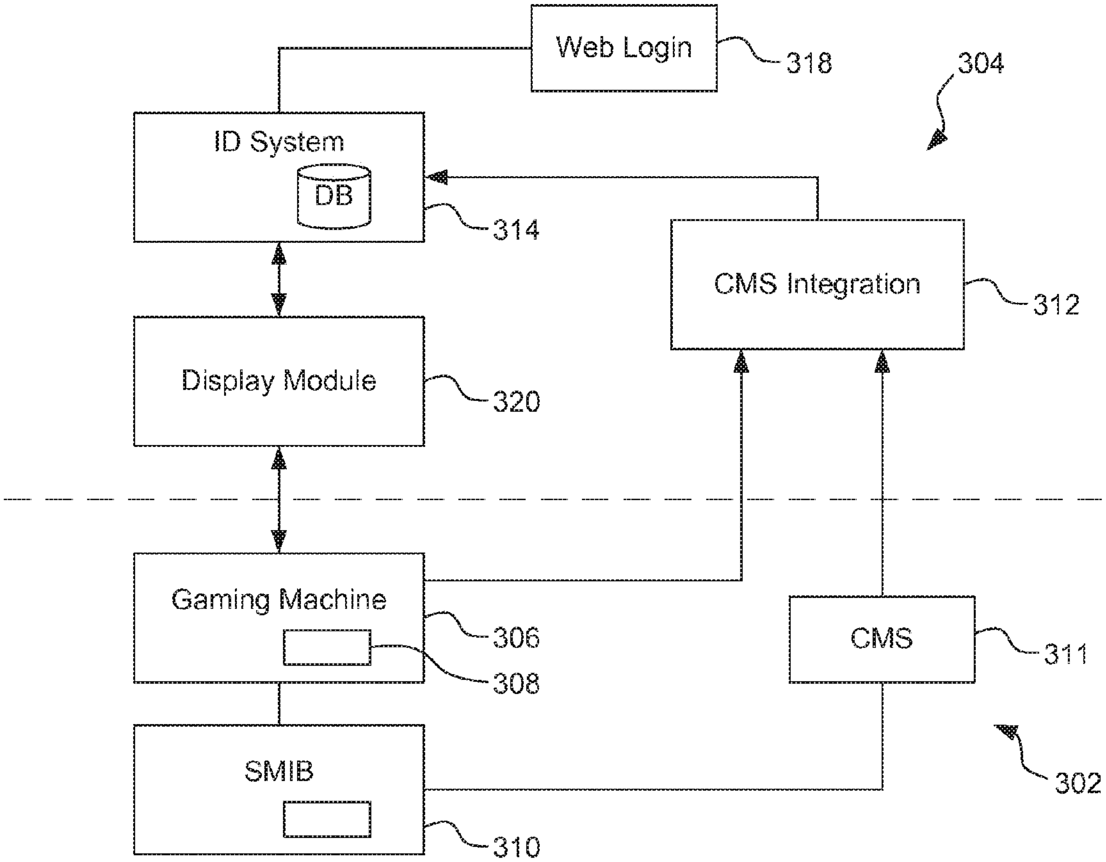
FIG. 3 is a block diagram showing relevant components in the WAN login system in accordance with one embodiment of the present invention.

Methods and systems for enabling a gaming machine to access player profile and game status data are described in the various figures. Operations for implementing embodiments of the present invention take place primarily on two systems or components. One is the gaming machine where the player typically identifies herself. The other is the game provider ID system. This system is typically not on the casino or gaming property premises, also referred to herein as enterprise, although parts of it can be. It is operated and controlled by the game provider, such as IGT, and has components, such as servers, databases, and various software, at other locations. The gaming machines and servers at the casino premises communicate with the game provider ID system components using one or more protocols, some of which may be specific to the gaming industry, and the Internet. Some of these components are shown in FIG. 3, described below.

FIG. 1 is a flow diagram of a process for resolving an enterprise player ID to a game provider federated ID in accordance with one embodiment of the present invention. The steps described are performed on game provider ID system components or on components under the game provider's control. Typically these components are at the game provider premises.

At step 102 the game provider's ID system receives a notification or message from a gaming component, such as a gaming machine or gaming server located at a casino/enterprise. In another embodiment, the notification can be from a personal computing device, such as a computer, smart phone, or a tablet. If the notification is coming from a casino it may contain an enterprise player ID and a gaming machine ID. In other embodiments the notification may consist only of an enterprise player ID in addition to other data.

There are various ways the player can be identified at the gaming machine, as described briefly below. The enterprise player ID may be a casino player tracking number assigned by the enterprise to a patron or another unique identifier of a player. The player ID may also be obtained from a credit card being inserted into the card reader or may originate from biometric data, such as a fingerprint or facial or retinal scan, if the gaming machine is so equipped. Generally, the enterprise player ID is an ID assigned to the player by an external entity. The notification may be sent using a gaming industry protocol, such as Game-To-System (G2S) protocol, an Ethernet-based protocol used by gaming machines and servers to exchange data. Other protocols and data transmission means may be used as well.

At step 104 the ID system determines whether there is a need to authenticate the source of the enterprise player ID, that is, whether there is a need to verify that the player at the gaming machine owns the identification device (player tracking card, credit card, etc.) that was presented to the gaming machine. It is anticipated that in most cases this authentication will not be needed. If there is a reason to authenticate, control goes to step 106 where the gaming machine validates the player by requesting a PIN or other authentication information and, if validated, can send a second notification to the game provider ID system stating that the player was validated. In another embodiment, the ID system itself can display a screen prompting the player for an ID system password. The game provider may have a portal or a reserved area on the gaming machine display (e.g., a service window implemented on IGT gaming machines) to be used by the game provider WAN system. It can be used to communicate with the player. The ID system may also prompt the player for a password via a handheld device, a retinal scan, facial recognition, and the like. The ID system has means for displaying prompts and other information to the player via a user interface through a display area on the gaming machine display. As noted, the software for the ID system user interface is the same so the player has the same user experience when interacting with the game provider ID system regardless of casino or property.

If the player is not able to authenticate herself, the process ends and the ID system or the casino may display a message to the player indicating so and providing further instructions. If the player is able to authenticate herself to the ID system, control goes to step 108 where the ID system queries a database of player profile data and attributes and game status data. The querying is done using the enterprise ID. In the embodiment described, it represents a server which provides access to a database of players and their attributes. Other suitable platforms and databases, depending on the application, may also be used. The database can be used to drive marketing and promotions.

At step 110 the ID system determines whether the enterprise ID exists in the database. The enterprise player ID may be afield in an Enterprise Account table in the database, as described in the entity-relationship diagram in FIG. 4 below. If the enterprise player ID is not in the database, control goes to step 112. In this case, the player may not have previously linked her enterprise player ID, such as her loyalty program number with her game player ID, also referred to as her federated ID. The game provider ID system may prompt the player for her game provider ID and password at step 112.

Here it is assumed that the player has previously signed up with the game provider ID system and was assigned a federated ID and password.

At step 114 the ID system links the enterprise player ID it received in step 102 with the player's game provider ID system account. The system may prompt the player after step 112 asking whether the player would like to proceed with linking the two accounts.

At step 110, if the enterprise player ID is found in the database (which is likely the more typical scenario), control goes to step 116 where the ID system obtains the federated player ID. At this stage the enterprise player ID has been resolved to a federated ID (i.e., game provider ID). The term federated is used here to characterize the game provider ID as being a single ID that matches multiple enterprise players IDs. That is, the ID system must be able to "federate" enterprise player IDs from multiple casinos, properties, and non-gaming entities to a single ID system identifier. Upon identifying and obtaining the federated player ID at step 116, control goes to step 118 where the federated ID is transmitted to the gaming machine or server which transmitted the original notification. More specifically, the ID is sent to the gaming machine operating system via an appropriate protocol (e.g., an extension to the G2S protocol). From there the federated ID is forwarded to the game that is or is about to execute on gaming machine. At this stage the game provider ID system has generally completed its steps. Operations on the gaming machine using the federated player ID may now execute.

Figure 2:
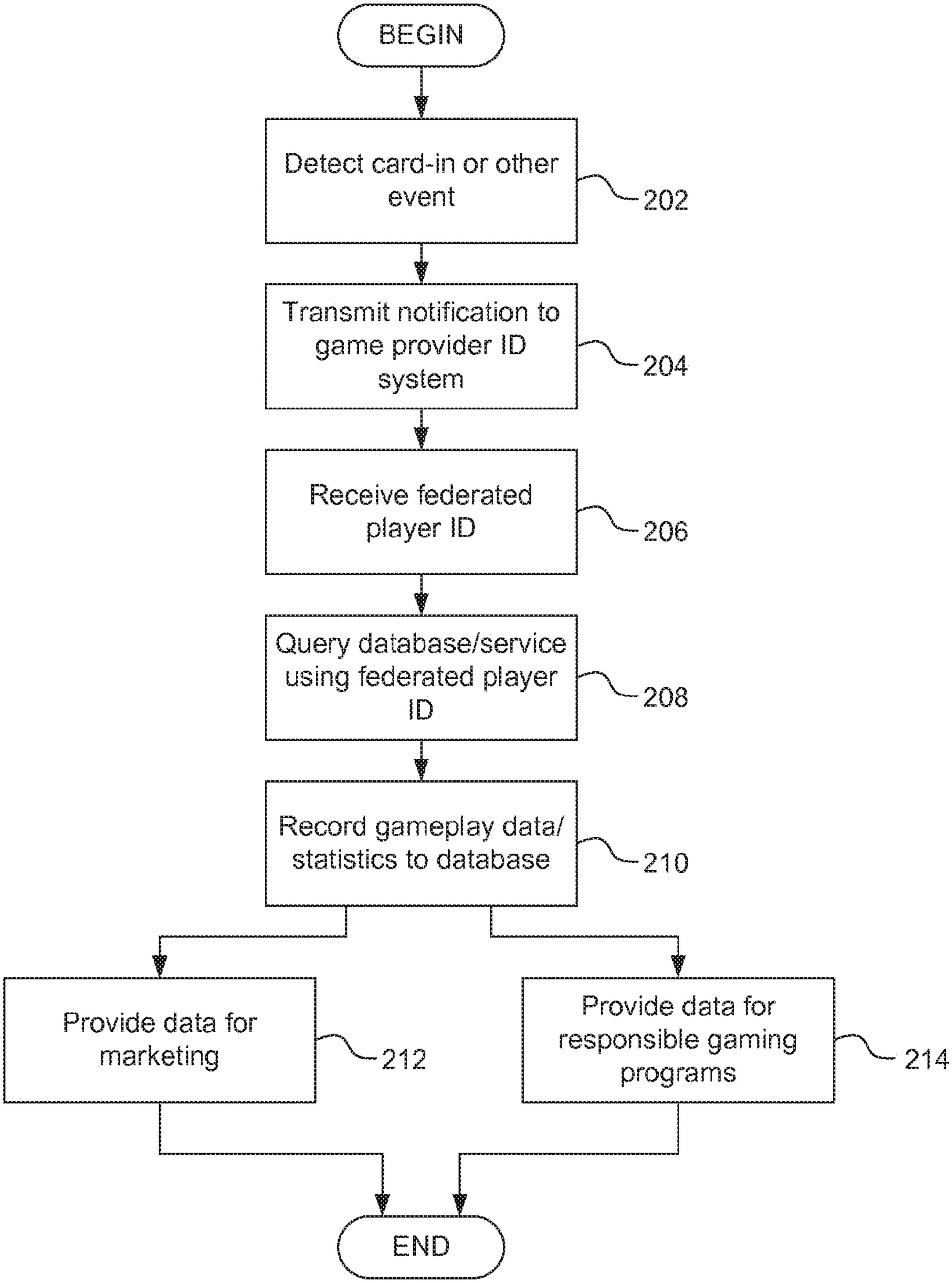
FIG. 2 is a flow diagram of a process of obtaining and utilizing a federated player ID at a gaming machine in accordance with one embodiment of the present invention.

FIG. 2 is a flow diagram of a process of obtaining and utilizing a federated player ID at a gaming machine in accordance with one embodiment of the present invention. At a step 202 the gaming machine detects a card-in or similar event. The card will typically be a player tracking card, but it may be another type of card (e.g., credit card) with a magnetic stripe that can provide a unique identifier for the player. Other known techniques may also be used, such as obtaining biometric data if the gaming machine is equipped to do so. Briefly, identification of the player may be obtained by using an external system with direct integration, via a game provider portal (a gaming machine display reserved for use by the game provider WAN system), or by using G2S and indirect integration. In most cases, the player is identified by inserting a card into a card reader in the gaming machine.

At step 204 a notification is transmitted to the game provider ID system that contains the enterprise player ID and a gaming machine identifier. This may be transmitted using any suitable protocol, such as G2S, GSA, Advantage, and the like. The notification may be sent directly from the gaming machine or it may be sent from a player tracking system server if a player tracking card was used with the machine. The notification essentially provides that a certain player is presently at a specific machine. In another embodiment, the notification may originate from a kiosk at a casino, a player tracking booth, or online.

In the described embodiment, at step 206 in the described embodiment, the gaming machine receives a federated player ID from the game provider ID system. The process of resolving the enterprise player ID to a federated ID is described in FIG. 1. The federated ID may be delivered to the gaming machine in any suitable form, such as in a token or other format. As noted, in one embodiment, the gaming machine operating system receives the ID which then forwards it to the game. At step 208 the external database or service is queried by the game using the federated ID to obtain additional information about the player, such as her game-specific context, her avatar (if the player has one), and other profile data as appropriate to the game. This query may go through a game server or directly to the database/service if the game or gaming machine is not using a game server.

In one embodiment, at step 210 the game or gaming machine records game play data and statistics based on game play currently taking place to the database/service. The data recorded to the database may include the player's wagers, wins, preferred games, and other statistics. This data may then be used for direct marketing or cross-marketing to the player as shown in step 212. Direct marketing to the player by the game provider may include offering coupons or promotional codes which would enable some number of "free play" games at any participating site. In return the player may sign-up for an account with the game provider over the Internet and provide contact information or as a result of the player qualifying through his play habits or other metrics. The participating site could be reimbursed for the cost of the "free play" games through direct reimbursement or through the reduction in the percentage of the jack pot participation fees. Other offers, such as gifts, coupons to retail establishments, entertainment tickets, and the like could be awarded to players that meet qualifying metrics. The game provider could also enter into cross-marketing arrangements with specific sites, enterprises (a number of sites under the same corporate management), or consortiums of enterprises to provide co-branded or white-labeled Internet sites and then provide offers to players which are specific to the arrangements with partners. The costs of the offers could be shared with the partners.

The data recorded in the database may also be used with responsible gaming programs as shown at step 214. Players can be notified when they are approaching their limits or reminded when they have exceeded their limits Game play can also be disabled for players who reach their limits.

FIG. 3 is a block diagram showing relevant components in the WAN login system in accordance with one embodiment of the present invention. Some of the components reside and operate on the casino property or enterprise shown as area 302 and other components are on the game provider premises shown as area 304, the areas separated by the dashed line. The primary component in enterprise area 302 is gaming machine 306 which may have its own card reader 308. If it does not, a slot machine interface board 310 having a card reader may be used using techniques known in the art. Data from SMIB 310 is transmitted to a casino management system 311 which implements player tracking, accounting, ticketing, and other functions. In either case, data from gaming machine 306, such as an enterprise player ID and other data, are transmitted to a casino management integration module 312 in game provider premises 304. This module is informed when a player has inserted a player tracking card to a gaming machine. This is done for gaming machines at multiple enterprises.

Data from module 312 is transmitted to a game provider ID system 314. This system contains several components, one of which is a player profile database 316 used for storing player data, game status, and data that can be used for marketing. A player may also log in to ID system 314 via the Internet. Web login module 318 is connected to game player ID system 314 and can be used by players to login online via handsets, tablets, and PCs. Data can be displayed on gaming machine 306 through a game provider display area or window. This is implemented by a gaming machine display module 320 which transmits data that can be displayed on gaming machine 306. In other embodiments, data may be transmitted to gaming machine 306 using a bus and a G2S module (not shown) or module supporting another suitable protocol which provide for a richer user experience on gaming machine 306. As described above, most of the operations described in FIG. 1 take place in game provider ID system 314 and operations in FIG. 2 take place on gaming machine 306.

Figure 4:
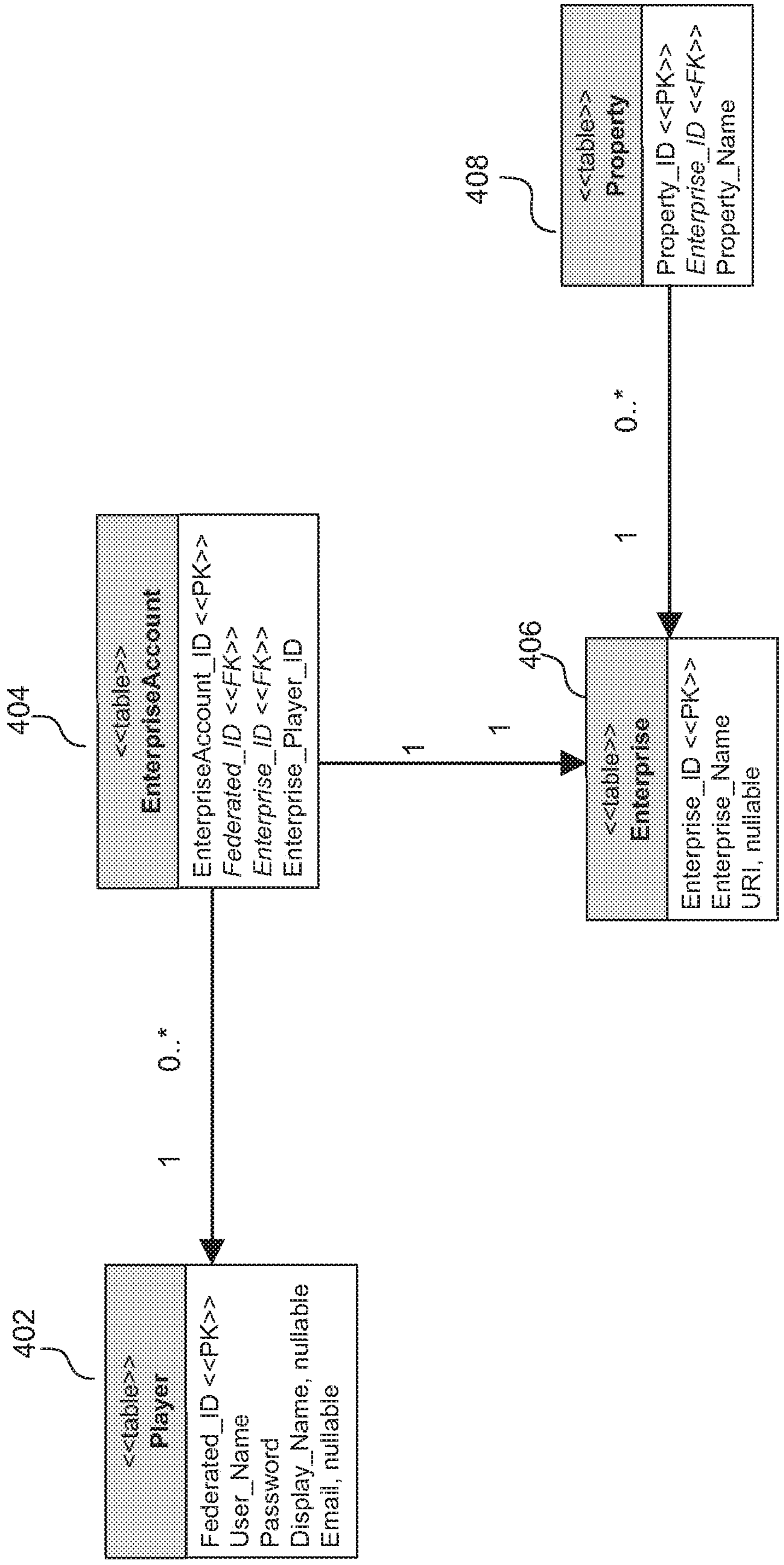
FIG. 4 is a conceptual entity-relationship diagram of the entity relationships required to create a federated player identifier.

In one embodiment, it is assumed that each enterprise manages its own, independent player tracking system without collaboration with other player tracking systems. As a result, the enterprise player ID for a player varies from one enterprise to the next. As noted above, the game provider ID system must therefore be able "federate" enterprise player IDs from many enterprises to a single, game provider identifier. FIG. 4 is a conceptual entity-relationship diagram of the entity relationships required to create a federated player identifier. A player record 402 may be linked to 0 to many EnterpriseAccount records 404. Each EnterpriseAccount record 404 represents a different path through which the player's identity may be established and optionally authenticated. Also shown are enterprise record 406 and property record 408. Note that not all ID providers can authenticate a player. For example, one player tracking system publishes an enterprise player ID when the player inserts her card into the card reader at a gaming machine, but this system does not publish any notification upon authenticating the player via PIN or other method.

Since enterprises may span multiple properties, the enterprise record may be linked to multiple property records. Internet Identity Providers, such as Facebook, Google, Yahoo!, and Windows Live ID are represented as enterprises which do not have any properties.

In another embodiment, login via a bar-coded ticket which is scanned by a bill validator and then ejected back to the player may also be supported. An enterprise named, "Game Provider Bar Code" or similar, may provide ticket validationIds to be stored in Enterprise_Player_ID field of the EnterpriseAccount record. Game Provider Bar Codes are generated by the game provider, thus they are unique across all properties and enterprises, and so there are no Property records associated with the "Game Provider Bar Code" enterprise.

Returning to the steps describing identifying and, if needed, authenticating a player at the gaming machine. In one embodiment, a player may be identified and authenticated at the gaming machine via a game provider portal. The gaming machine provides a "login" button on the machine display. When the player presses this button, she is presented with a screen which prompts her to enter a user name and password. This screen also gives the player an opportunity to create an account with the game provider. Calls are made into the game provider ID system to either validate the credentials provided by the player or create a new account. Once the player has provided their credentials (e.g., username and password) via the game provider portal, she may chose to link the account to the enterprise player ID currently known by the gaming machine. This requires that the game provider ID system and the external player tracking system are either directly or indirectly integrated.

In another embodiment, the player is identified through indirect integration via G2S. The gaming machine operating system receives the player's enterprise ID through the G2S protocol. This use case can be employed when the external player tracking system serves the role of an ID Reader host (as defined in the G2S protocol). No direct integration between the game provider ID system and the external player tracking host is required because G2S enables the gaming machine to act as a bridge for G2S hosts to recover data provided by other G2S hosts to the gaming machine.

If the external player tracking system is not a G2S ID Reader host, other integration with the external player tracking system is possible. In SAS, for example, the external player tracking system could use the SAS Player Tracking Notification extension to provide the enterprise player ID to the gaming machine. The gaming machine can then send this information to the game provider ID service.

In another embodiment, a 'vampire' tap can be used to interface to the external player tracking system. The vampire tap reads the magnetic stripe data at the same time that the external player tracking system card reader hardware reads the magnetic stripe. This can be accomplished by interfacing directly to the electrical signals generated by the card reader or by installing a second card reader in front of the external player tracking card reader and reading the magnetic stripe in tandem.

Figure 5:
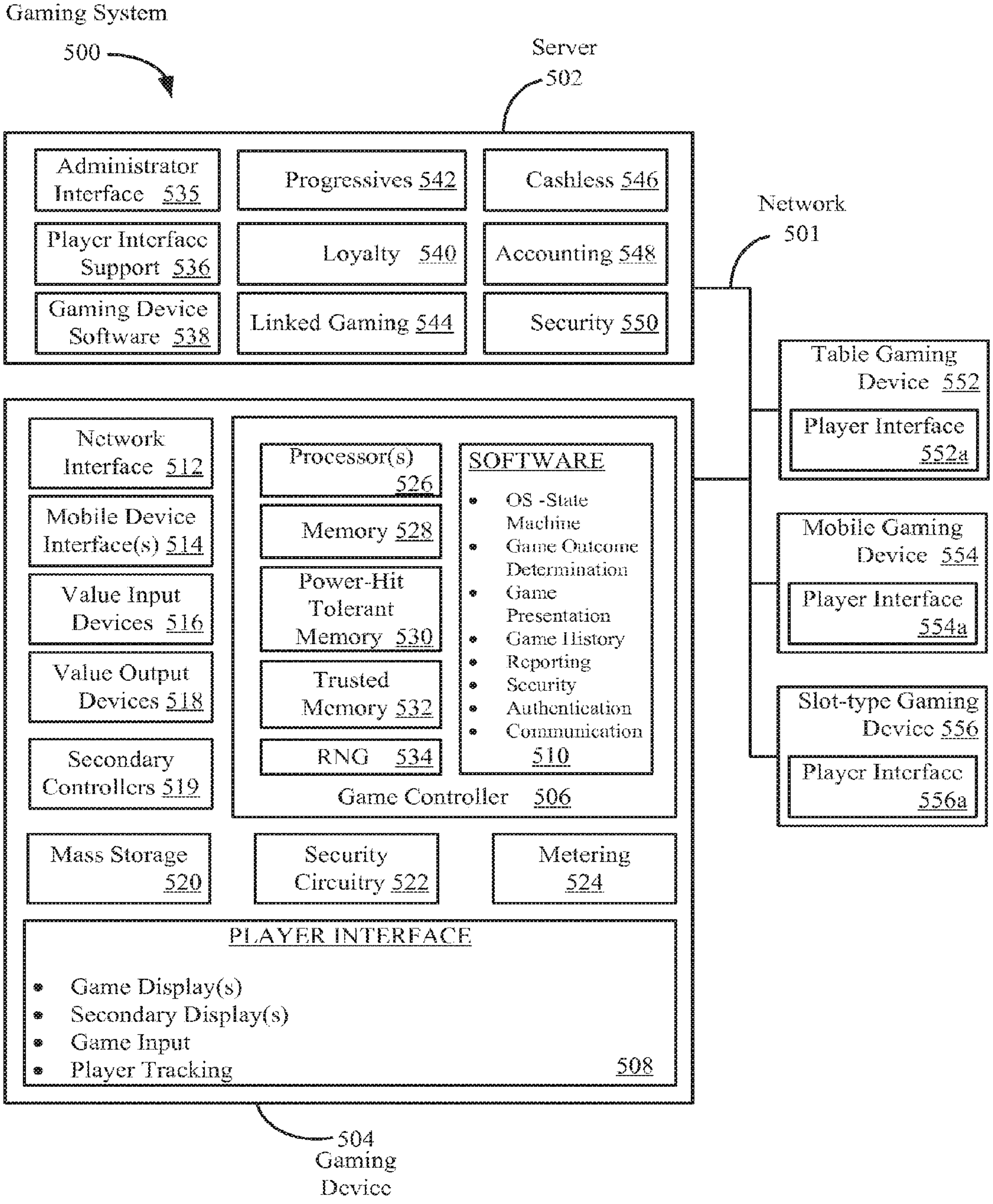
FIG. 5 shows a block diagram of a gaming system including a server and gaming devices in accordance with the described embodiments.

FIG. 5 shows a block diagram of a gaming system 500 in accordance with the described embodiments. The gaming system 500 can include one or more servers, such as server 502, and a variety of gaming devices including but not limited to table gaming devices, such as 552, mobile gaming devices, such as 554, and slot-type gaming devices, such as 556. The table gaming devices, such as 552, can include apparatus associated with table games where a live operator or a virtual operator is employed. The gaming devices and one or more servers can communicate with one another via a network 501. The network can include wired, wireless or a combination of wired and wireless communication connections and associated communication routers.

Some gaming devices, such as 552, 554 and 556, can be configured with a player interface that allows at least 1) selections, such as a wager amount, associated with a wager-based game to be made and 2) an outcome of the wager-based game to be displayed. As an example, gaming devices, 552, 554 and 556, include player interfaces, 552*a*, 554*a* and 556*a*, respectively. Typically, gaming devices with a player interface are located in publically accessible areas, such as a casino floor. On the other hand, some gaming devices, such as server 502, can be located in publically inaccessible areas, such is in a back-room of a casino or even off-site from the casino. Gaming devices located in publically inaccessible areas may not include a player interface. For instance, server 502 does not include a player interface. However, server 502 includes an administrator interface 535 that allows functions associated with the server 502 to be adjusted.

An example configuration of a gaming device is described with respect to gaming device 504. The gaming device 504 can include 1) a game controller 506 for controlling a wager-based game played on the gaming device and 2) a player interface 508 for receiving inputs associated with the wager-based game and for displaying an outcome to the wager-based game. In more detail, the game controller 506 can include a) one or more processors, such as 526, b) memory for holding software executed by the one or more processors, such as 528, c) a power-hit tolerant memory, such as 530, d) one or more trusted memories, such as 532, e) a random number generator and f) a plurality of software applications, 510. The other gaming devices, including table gaming device 552, mobile gaming device 554, slot-type gaming device 556 and server 502, can each include a game controller with all or a portion of the components described with respect to game controller 506.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 430 can be used as a persistent memory for critical data, such as critical data associated with maintaining a "state" machine on the gaming device. One characteristic of a power-hit tolerant memory 530 is a fast data transfer time. Thus, in the event of a power-failure, which might be indicated by a sudden power fluctuation, the critical data can be quickly loaded from volatile memory, such as RAM associated with the processor 526, into the power-hit tolerant memory 530 and saved.

In one embodiment, the gaming device 505 can be configured to detect power fluctuations and in response, trigger a transfer of critical data from RAM to the power-hit tolerant memory 530. One example of a power-hit tolerant memory 530 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 532 is typically a read-only memory of some type that may be designed to be unalterable. An EPROM or EEPROM are two types of memory that can be used as a trusted memory 532. The gaming device 504 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 532, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 504. In one embodiment, the error condition can result in the gaming device entering a tilt state where game play is temporarily disabled on the gaming device.

Sometimes verification of software executed on the gaming device 504 can be performed by a regulatory body, such as a government agency. Often software used by a game controller, such as 506, can be highly regulated, where only software approved by a regulatory body is allowed to be executed by the game controller 506. In one embodiment, the trusted memory 532 can store authentication programs and/or authentication data for authenticating the contents of various memories on the gaming device 504. For instance, the trusted memory 532 can store an authentication program that can be used to verify the contents of a mass storage device, such as 520, which can include software executed by the game controller 506.

The random number generator (RNG) 534 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 504, are considered critical data. Thus, generated outcomes can be stored to the power-hit tolerant memory 530.

Not all gaming devices may be configured to generate their own game outcomes and thus, may not use an RNG for this purpose. In some embodiments, game outcomes can be generated on a remote device, such as server 502, and then transmitted to the gaming device 504 where the outcome and an associated award can be displayed to the player via the player interface 508. For instance, outcomes to a slot-type game or a card game can be generated on server 502 and transmitted to the gaming device 504.

In other embodiments, the gaming device 504 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 502. Next, in response to a request to play the central determination game on gaming device 504, one of the outcomes from the pool can be downloaded to the gaming device 504. A game presentation including the downloaded outcome can be displayed on the gaming device 504.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 554 to server 502. After receiving the game outcome from the remote device, a game presentation for the game outcomes generated remotely can be generated and displayed on the mobile device. In some instances, the game presentation can also be generated remotely and then streamed for display to the mobile device.

The game controller 506 can be configured to utilize and execute many different types of software applications 510. Typically, the software applications utilized by the game controller 506 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 526, such as programs for implementing a state machine on the gaming device 506. Further, the OS can be used to monitor resource utilization on the gaming device 506. For instance, certain applications, such as applications associated with game outcome generation and game presentation that are executed by the OS can be given higher priority to resources, such as the processor 526 and memory 528, than other applications that can be executing simultaneously on the gaming device.

As previously described, the gaming device 504 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 506. The peripheral devices used to generate components of the game outcome presentation can be associated with the player interface 508 where the types of devices that are utilized for the player interface 608 can vary from device to device.

To play a game, various inputs can be required. For instance, via input devices coupled to the gaming device 504, a wager amount can be specified, a game can be initiated or a selection of a game choice associated with the play of the game can be made. The software 510 executed by the game controller 506 can be configured to interpret various signals from the input devices, such as signals received from a touch screen controller or input buttons, and affect the game played on the gaming device in accordance with the received input signals. The input devices can also be part of the player interface 508 provided with the gaming device, such as 504.

In other embodiments, the gaming software 510 executed by the game controller 506 can include applications that allow a game history including the results of a number of past games to be stored, such as the previous 10 or 100 games played on the gaming device 504. The game history can be stored to a persistent memory including but not limited to the power-hit tolerant memory 530. The gaming controller 506 can configured to provide a menu (typically, only operator accessible), that allows the results of a past game to be displayed via the player interface 508. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 504.

The reporting software can be used by the game controller 506 to report events that have occurred on the gaming device 504 to remote device, such as server 502. For instance, in one embodiment, the game controller 506 can be configured to report error conditions that have been detected on the gaming device 504, such as if a device has malfunctioned or needs attention. For instance, the reporting software can be used to send a message from the gaming device 504 to the server 502 indicating that a printer on the gaming device needs a refill of tickets. In another embodiment, the gaming controller 506 can be configured to report security events that may have occurred on the gaming device 504, such as but not limited to if a door is opened, a latch is activated or an interior portion of the gaming device 504 has been accessed.

In yet other embodiments, the game controller 506 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 504. As part of a loyalty program, the gaming activity can be associated with a particular player. The reporting software can include player tracking elements that allow the gaming activity of a particular player to be reported to a remote device, such as server 502.

The game controller 506 can execute the authentication software to verify the authenticity of data and/or software programs executed on the gaming device 504. For instance, the authentication software can be used to verify the authenticity of data and/or software applications when they are first downloaded to the gaming device 504. Further, the authentication software can be used to periodically verify the authenticity of data and/or software applications currently residing on the gaming device, such as software applications stored on one of the memories coupled to the gaming device 504 including applications loaded into the memory 528 for execution by the processor 526.

The communication software executed by the game controller 506 can be used to communicate with a variety of devices remote to the gaming device 504. For instance, the communication software can be used to communicate with one or more of a) servers remote to the device, such as 502, b) other gaming devices, such as table gaming device 552, mobile gaming device 554 and slot-type gaming device 556 and c) mobile devices carried by casino personnel or players in the vicinity of the gaming device 504. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 504 can communicate with one or more remote devices via one or more network interfaces, such as 512. For instance, via network interfaces 512 and the network 501, the gaming device 504 can communicate with other gaming devices, such as server 502 and/or gaming devices, 552, 554 and 556. The network interfaces can provide wired or wireless communications pathways for the gaming device 504. Some gaming devices may not include a network interface or can be configured to operate in a stand-alone mode where the network interface is not connected to a network.

In other embodiments, a mobile device interface or interfaces, such as 514, can be provided for communicating with a mobile device, such as a cell phone or a tablet computer carried by players or casino personnel temporarily in the vicinity of the gaming device 504. A wireless communication protocol, such as Bluetooth™ and a Wi-Fi compatible standard, can be used for communicating with the mobile devices via the mobile device interfaces 514. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 504. The wired communication interface can be configured to provide communications between the gaming device 504 and the mobile device and/or providing power to the mobile device.

The gaming device 504 can include one or more each of value input devices 516 and value output device 518. The value input devices 516 can be used to deposit cash or indicia of credit onto the gaming device. The cash or indicia of credit can be used to make wagers on games played on the gaming device 504. Examples of value input devices 516 include but are not limited to a magnetic-striped card or smart card reader, a bill and/or ticket acceptor, a network interface for downloading credits from a remote source, a wireless communication interface for reading credit data from nearby devices and a coin acceptor.

The value output devices can be used to dispense cash or indicia of credit from the gaming device 504. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 516 and value output devices 518 can vary from device to device. In some embodiments, a gaming device 504 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 504 can include one or more secondary controllers 519. The secondary controllers can be associated with various peripheral devices coupled to the gaming device, such as the value input devices and value output devices described in the preceding paragraphs. As another example, the secondary controllers can be associated with peripheral devices associated with the player interface 508, such as input devices, video displays, electro-mechanical displays and a player tracking unit. In some embodiments, the secondary controllers can receives instructions and/or data from and provide responses to the game controller 506. The secondary controller can be configured to interpret the instructions and/or data from the game controller 506 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 506 characterizing the touch input.

In a particular embodiment, a secondary controller can be used to control a number of peripheral devices independently of the game controller 506. For instance, a player tracking unit can include one or more of a video display, a touch screen, card reader, network interface or input buttons. A player tracking controller can control these devices to provide player tracking services and bonusing on the gaming device 504. In alternate embodiments, the game controller 504 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 506, which does control the wager-based game. In general, using a secondary controller, certain functions of the gaming device 504 that are not subject to as much regulatory scrutiny as the game play functions can be decoupled from the game controller 506 and implemented on the secondary controller instead. An advantage of this approach, like for the player tracking controller, is that software approval process for the software executed by the secondary controller can be less intensive than the process needed to get software approved for the game controller.

A mass storage unit(s) 520, such as a device including a hard drive, optical disk drive, flash memory or some other memory storage technology can be used to store applications and data used and/or generated by the gaming device 504. For instance, a mass storage unit, such as 520, can be used to store gaming applications executed by the game controller 506 where the gaming device 504 can be configured to receive downloads of game applications from remote devices, such as server 502. In one embodiment, the game controller 506 can include its own dedicated mass storage unit. In another embodiment, critical data, such as game history data stored in the power-hit tolerant memory 530 can be moved from the power-hit tolerant memory 530 to the mass storage unit 520 at periodic intervals for archival purposes and to free up space in the power-hit tolerant memory 530.

The gaming device 504 can include security circuitry 522, such as security sensors and circuitry for monitoring the sensors. The security circuitry 522 can be configured to operate while the gaming device is receiving direct power and operational to provide game play as well as when the gaming device is uncoupled from direct power, such as during shipping or in the event of a power failure. The gaming device 504 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 504, such as a mobile device has been moved to an unauthorized area. The security monitoring circuitry can be configured to generate, store and/or transmit error events when the security events, such as accessing the interior of the gaming device, have occurred. The error events may cause the game controller 506 to place itself in a "safe" mode where no game play is allowed until the error event is cleared.

The server 502 can be configured to provide one or more functions to gaming devices or other servers in a gaming system 500. The server 502 is shown performing a number of different functions. However, in various embodiments, the functions can be divided among multiple servers where each server can communicate with a different combination of gaming devices. For instance, player interface support 536 and gaming device software 538 can be provided on a first server, progressives can be provided on a second server, loyalty program functions 540 and accounting 548 can be provided on a third server, linked gaming 544 can be provided on a fourth server, cashless functions 546 can be provided on a fifth server and security functions 550 can be provided on a sixth server. In this example, each server can communicate with a different combination of gaming devices because each of the functions provided by the servers may not be provided to every gaming device in the gaming system 500. For instance, the server 502 can be configured to provide progressive gaming functions to gaming devices 504, 552 and 556 but not gaming device 554. Thus, the server 502 may not communicate with the mobile gaming device 554 if progressive functions are not enabled on the mobile gaming device at a particular time.

Typically, each server can include an administrator interface that allows the functions of a server, such as 502, to be configured and maintained. Each server 502 can include a processor and memory. In some embodiments, the servers, such as 502, can include a game controller with components, such as but not limited to a power-hit tolerant memory 530, a trusted memory 532 and an RNG 534 described with respect to gaming device 504. The servers can include one or more network interfaces on which wired or wireless communication protocols can be implemented. Next, some possible functions provided by the server 502 are described. These functions are described for the purposes of illustration only and are not meant to be limiting.

The player interface support 536 can be used to serve content to gaming devices, such as 504, 552, 554 and 556, remote to the server. The content can include video and audio content that can be output on one of the player interfaces, such as 508, **552*a*, 554*a* and 556*a***. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 536 can be affected by inputs made on the gaming device. For instance, the service window can be generated on a touch screen display where inputs received via the service window can be sent back to server 502. In response, to the received inputs, the server 502 can adjust the content that is displayed on the remote gaming device that generated the inputs.

If a player's identity is known, then the player interface support 536 can be used to provide custom content to a remote gaming device, such as 504. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 540. The custom content can include notifications, advertising and specific offers that are determined to be likely of interest to a particular player.

The gaming device software function 538 can be used to provide downloads of software for the game controller and/or second controllers associated with peripheral devices on a gaming device. For instance, the gaming device software 538 may allow an operator and/or a player to select a new game for play on a gaming device. In response to the game selection, the gaming device software function 538 can be used to download game software that allows a game controller to generate the selected game. In another example, in response to determining that a new counterfeit bill is being accepted by bill acceptors in the gaming system 500, the gaming device software function 538 can be used to download a new detection algorithm to the bill acceptors that allow the counterfeit bill to be detected.

The progressive gaming function 542 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 542 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 540 can be used to implement a loyalty program within a casino enterprise. The loyalty function 540 can be used to receive information regarding activities within a casino enterprise including gaming and non-gaming activities and associate the activities with particular individuals. The particular individuals can be known or may be anonymous. The loyalty function 540 can used to store a record of the activities associated with the particular individuals as well as preferences of the individuals if known. Based upon the information stored with the loyalty function 540 comps (e.g., free or discounted services including game play), promotions and custom contents can be served to the particular individuals.

The linked gaming function 544 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 546 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 500. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 550 can be used to combat fraud and crime in a casino enterprise. The security function 550 can be configured to receive notification of a security event that has occurred on a gaming device, such as an attempt at illegal access. Further, the security function 550 can receive transactional data that can be used to identify if gaming devices are being utilized in a fraudulent or unauthorized manner. The security function 550 can be configured to receive, store and analyze data from multiple sources including detection apparatus located on a gaming device and detection apparatus, such as cameras, distributed throughout a casino. In response to detecting a security event, the security function 550 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 504 is described.

Figure 6:
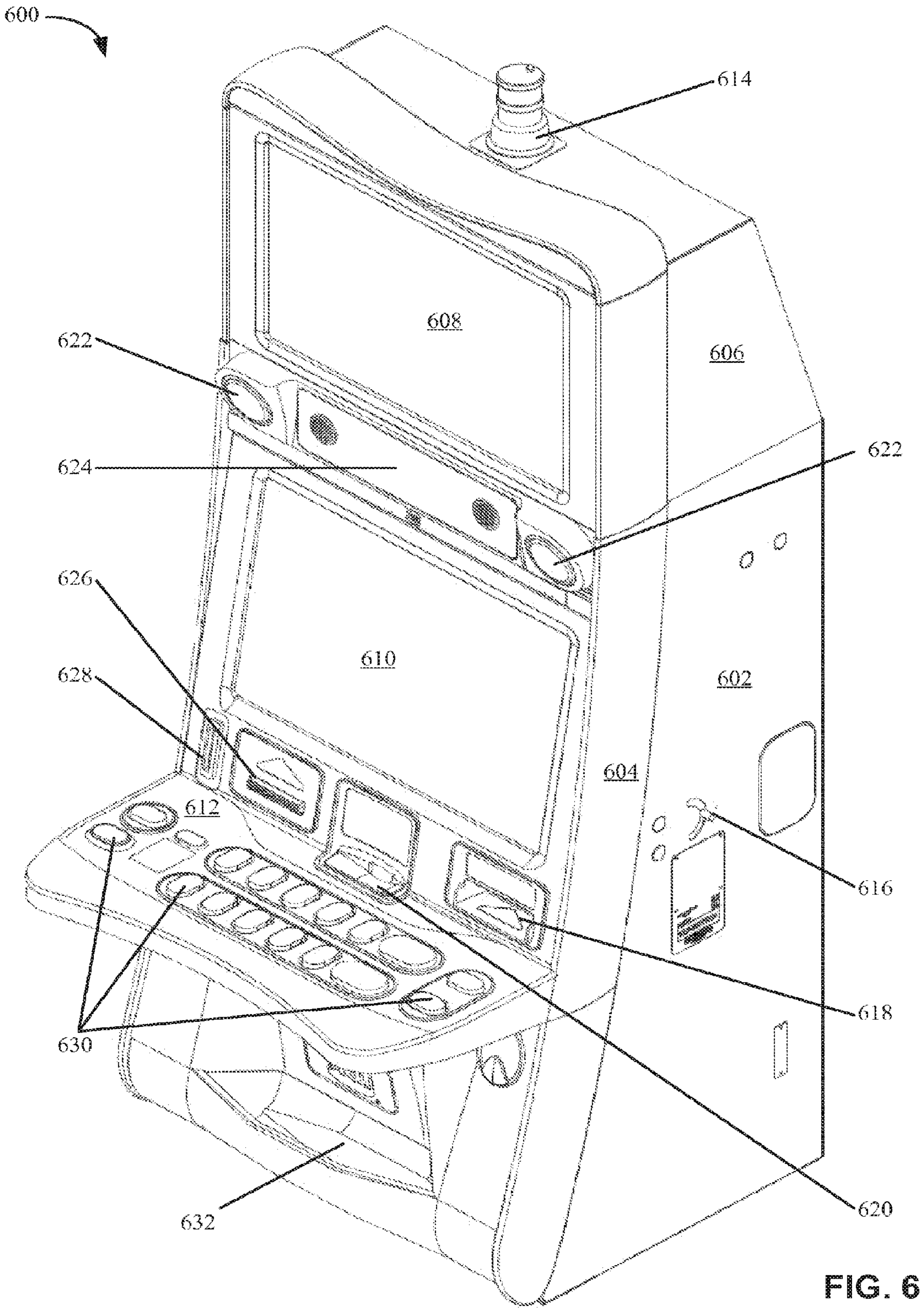
FIG. 6 shows a perspective drawing of a gaming device in accordance with the described embodiments.

FIG. 6 shows a perspective drawing of a gaming device 600 in accordance with the described embodiments. The gaming device 600 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 600, deployed in a central determination configuration, may receive game outcomes from a remote server but still provide cash handling capabilities. Further, the peripheral devices can vary from gaming device to gaming device. For instance, the gaming device 600 can be configured with electro-mechanical reels to display a game outcome instead of a video display, such as 610. Thus, the features of gaming device 600 are described for the purposes of illustration only and are not meant to be limiting.

The gaming device 600 can include a main cabinet 602. The main cabinet 602 can provide a secure enclosure that prevents tampering with the device components, such as a game controller (not shown) located within the interior of the main cabinet and cash handing devices including a coin acceptor 620, a ticket printer 626 and a bill acceptor 618. The main cabinet can include an access mechanism, such as door 604, which allows an interior of the gaming device 600 to be accessed. The actuation of the door 604 can be controlled by a locking mechanism, such as lock 616. The lock 616, the door 604 and the interior of the main cabinet 602 can be monitored with security sensors for detecting whether the interior has been accessed. For instance, a light sensor can be provided to detect a change in light-level in response to the door 604 being opened.

The interior of the main cabinet 600 can include additional secure enclosure, which can also be fitted with locking mechanisms. For instance, the game controller, such as game controller 506, shown in FIG. 5, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 620, the separate enclosure can protect the electronics of the game controller from potentially damaging coin dust.

A top box 606 can be mounted to the top of the main cabinet 602. A number of peripheral devices can be coupled to the top box 606. In FIG. 6, a display device 608 and a candle device 614 are mounted to the top box 606. The display device 608 can be used to display information associated with game play on the gaming device 600. For instance, the display device 608 can be used to display a bonus game presentation associated with the play of a wager-based game (One or more bonus games are often features of many wager-based games). In another example, the display device 608 can be used to display information associated with a progressive game, such as one or more progressive jackpot amounts. In yet another example, the display device 608 can be used to display an attract feature that is intended to draw a potential player's attention to the gaming device 600 when it is not in use.

The candle device 614 can include a number of lighting elements. The lighting elements can be lit in different patterns to draw attention to the gaming device. For instance, one lighting pattern may indicate that service is needed at the gaming device 600 while another light pattern may indicate that a player has requested a drink. The candle device 614 is typically placed at the top of gaming device 600 to increase its visibility. Other peripheral devices, including custom bonus devices, such as reels or wheels, can be included in atop box 606 and the example in FIG. 6 is provided for illustrative purposes only. For instance, some of the devices coupled to the main cabinet 602, such as printer 626, can be located in a different top box configuration.

The gaming device 600 provides a player interface that allows the play of a game, such as wager-based game. In this embodiment, the player interface includes 1) a primary video display 610 for outputting video images associated with the game play, 2) audio devices, such as 622, for outputting audio content associated with game play and possibly casino operations, 3) an input panel 612 for at least providing game play related inputs and 4) a secondary video display 608 for outputting video content related to the game play (e.g., bonus material) and/or the casino enterprise (e.g., advertising). In particular embodiments, one or both of the video displays, 608 and 610, can be equipped with a touch screen sensor and associated touch screen controller, for detecting touch inputs, such as touch inputs associated with the play of a game or a service window output to the display device.

The input panel 612 can include a number of electro-mechanical input buttons, such as 630, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 600 includes a card reader 628, a printer 626, a coin acceptor 620, a bill and/or ticket acceptor 620 and a coin hopper (not shown) for dispensing coins to a coin tray 632. These devices can provide value input/output capabilities on the gaming device 600. For instance, the printer 626 can be used to print out tickets redeemable for cash or additional game play. The tickets generated by printer 626 as well as printers on other gaming devices can be inserted into bill and ticket acceptor 618 to possibly add credits to the gaming device 600. After the ticket is authenticated, credits associated with the ticket can be transferred to the gaming device 600.

The device 618 can also be used to accept cash bills. After the cash bill is authenticated, it can be converted to credits on the gaming device and used for wager-based game play. The coin acceptor 620 can be configured to accept coins that are legal tender or tokens, such as tokens issued by a casino enterprise. A coin hopper (not shown) can be used to dispense coins that are legal tender or tokens into the coin tray 632.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention is claimed as follows:

1. A gaming system comprising:

a housing;

a plurality of input devices supported by the housing, the plurality of input devices including:

(i) an acceptor, and (ii) a cashout device;

at least one display device supported by the housing;

at least one processor; and at least one memory device which stores a plurality of instructions, which when executed by the at least one processor, causes the at least one processor to operate with the plurality of input devices and the at least one display device to:

(a) if a physical item is received via the acceptor, establish a credit balance based, at least in part, on a monetary value associated with the received physical item, (b) receive a first enterprise player identifier from a player, wherein the first enterprise player identifier is a gaming establishment-specific identifier assigned by a first gaming establishment to the player, (c) communicate the received first enterprise player identifier to a game provider identification system, wherein the first enterprise player identifier and at least a second enterprise player identifier are each associated with a federated player identifier, and the received first enterprise player identifier is utilized to log into the game provider identification system, (d) for a play of a game:

determine a game outcome, (ii) display the determined game outcome, (iii) determine any game award associated with the determined game outcome, and (iv) display any determined game award, wherein at least one of the determined game outcome and the determined game award are tracked by the game provider identification system logged into by the first enterprise player identifier, and (e) if a cashout input is received via the cashout device, cause an initiation of any payout associated with the credit balance.

2. The gaming system of claim 1, wherein the second enterprise player identifier is a gaming establishment-specific identifier assigned by a second, different gaming establishment to the player.

3. The gaming system of claim 2, wherein the federated player identifier is utilized in association with a game provider promotion occurring at at least the first gaming establishment and the second gaming establishment.

4. The gaming system of claim 1, wherein the first enterprise player identifier is a player tracking number assigned by the first gaming establishment.

5. The gaming system of claim 1, wherein the federated player identifier is utilized to track the player in association with a responsible gaming program.

6. A gaming system server comprising:

at least one processor; and at least one memory device which stores a plurality of instructions, which when executed by the at least one processor, causes the at least one processor to:

(a) receive data associated with a first enterprise player identifier from a player, wherein the first enterprise player identifier is a gaming establishment-specific identifier assigned by a first gaming establishment to the player, (b) communicate the received first enterprise player identifier to a game provider identification system, wherein the first enterprise player identifier and at least a second enterprise player identifier are each associated with a federated player identifier, and the received first enterprise player identifier is utilized to log into the game provider identification system, and (c) for a play of a game:

(i) determine a game outcome, (ii) cause at least one display device to display the determined game outcome, (iii) determine any game award associated with the determined game outcome, and (iv) cause the at least one display device to display any determined game award, wherein at least one of the determined game outcome and the determined game award are tracked by the game provider identification system logged into by the first enterprise player identifier and any determined game award causes an increase of a credit balance which is increasable via an acceptor of a physical item associated with a monetary value, and decreasable via a cashout device.

7. The gaming system server of claim 6, wherein the second enterprise player identifier is a gaming establishment-specific identifier assigned by a second, different gaming establishment to the player.

8. The gaming system server of claim 7, wherein the federated player identifier is utilized in association with a game provider promotion occurring at at least the first gaming establishment and the second gaming establishment.

9. The gaming system server of claim 6, wherein the first enterprise player identifier is a player tracking number assigned by the first gaming establishment.

10. The gaming system server of claim 6, wherein the federated player identifier is utilized to track the player in association with a responsible gaming program.

11. A method of operating a gaming system, said method comprising:

(a) receiving data associated with a first enterprise player identifier from a player, wherein the first enterprise player identifier is a gaming establishment-specific identifier assigned by a first gaming establishment to the player, (b) causing at least one processor to execute a plurality of instructions to communicate the received first enterprise player identifier to a game provider identification system, wherein the first enterprise player identifier and at least a second enterprise player identifier are each associated with a federated player identifier, and the received first enterprise player identifier is utilized to log into the game provider identification system, and (c) for a play of a game:

(i) causing the at least one processor to execute the plurality of instructions to determine a game outcome, (ii) causing at least one display device to display the determined game outcome, (iii) causing the at least one processor to execute the plurality of instructions to determine any game award associated with the determined game outcome, and (iv) causing the at least one display device to display any determined game award, wherein at least one of the determined game outcome and the determined game award are tracked by the game provider identification system logged into by the first enterprise player identifier and any determined game award causes an increase of a credit balance which is increasable via an acceptor of a physical item associated with a monetary value, and decreasable via a cashout device.

12. The method of claim 11, wherein the second enterprise player identifier is a gaming establishment-specific identifier assigned by a second, different gaming establishment to the player.

13. The method of claim 12, wherein the federated player identifier is utilized in association with a game provider promotion occurring at at least the first gaming establishment and the second gaming establishment.

14. The method of claim 11, wherein the first enterprise player identifier is a player tracking number assigned by the first gaming establishment.

15. The method of claim 11, wherein the federated player identifier is utilized to track the player in association with a responsible gaming program.

16. The method of claim 11, which is provided through a data network.

17. The method of claim 16, wherein the data network is an internet.

* * * * *